US00RE41712E

(19) United States
(12) Reissued Patent
Glas

(10) Patent Number: US RE41,712 E
(45) Date of Reissued Patent: Sep. 21, 2010

(54) GARBAGE SACK

(76) Inventor: Jan Glas, 60 Rue de la Montagne, L-7238 Walferdange (LU)

(21) Appl. No.: 29/314,257

(22) Filed: Dec. 5, 2008

Related U.S. Patent Documents

Reissue of:
(64) Patent No.: Des. 546,520
Issued: Jul. 10, 2007
Appl. No.: 29/198,889
Filed: Feb. 6, 2004

(30) Foreign Application Priority Data

Aug. 6, 2003 (EP) ..... 00076088-0001

(51) LOC (9) Cl. ..... 09-09
(52) U.S. Cl. ..... D34/1; D9/703
(58) Field of Classification Search ..... D34/1, D34/5, 6; 15/257.9, 257.7; 383/5, 63, 33, 383/34, 26, 27, 104, 121, 1, 903, 4, 73; 220/908.1; D3/203.1; D32/30; D9/703
See application file for complete search history.

(56) References Cited

U.S. PATENT DOCUMENTS

D546,520 S * 7/2007 Glas ..... D34/1

* cited by examiner

*Primary Examiner*—Cynthia E Ramirez
(74) *Attorney, Agent, or Firm*—Jennifer E. Lacroix, Esq.; DLA Piper US LLP

(57) CLAIM

The ornamental design for a garbage sack, as shown and described.

DESCRIPTION

FIG. 1 is a front perspective view of a garbage sack in the open position showing my new design;
FIG. 2 is a rear perspective view of a garbage sack in the open position;
FIG. 3 is a bottom perspective view of a garbage sack in the open position;
FIG. 4 is a right side elevational view of a garbage sack, with the left side elevational view being a mirror image thereto; and,
FIG. 5 is a top plan view of a garbage sack, in a closed or comressed position. The broken lines on the garbage sack depict folds.

1 Claim, 5 Drawing Sheets

Figure 1:
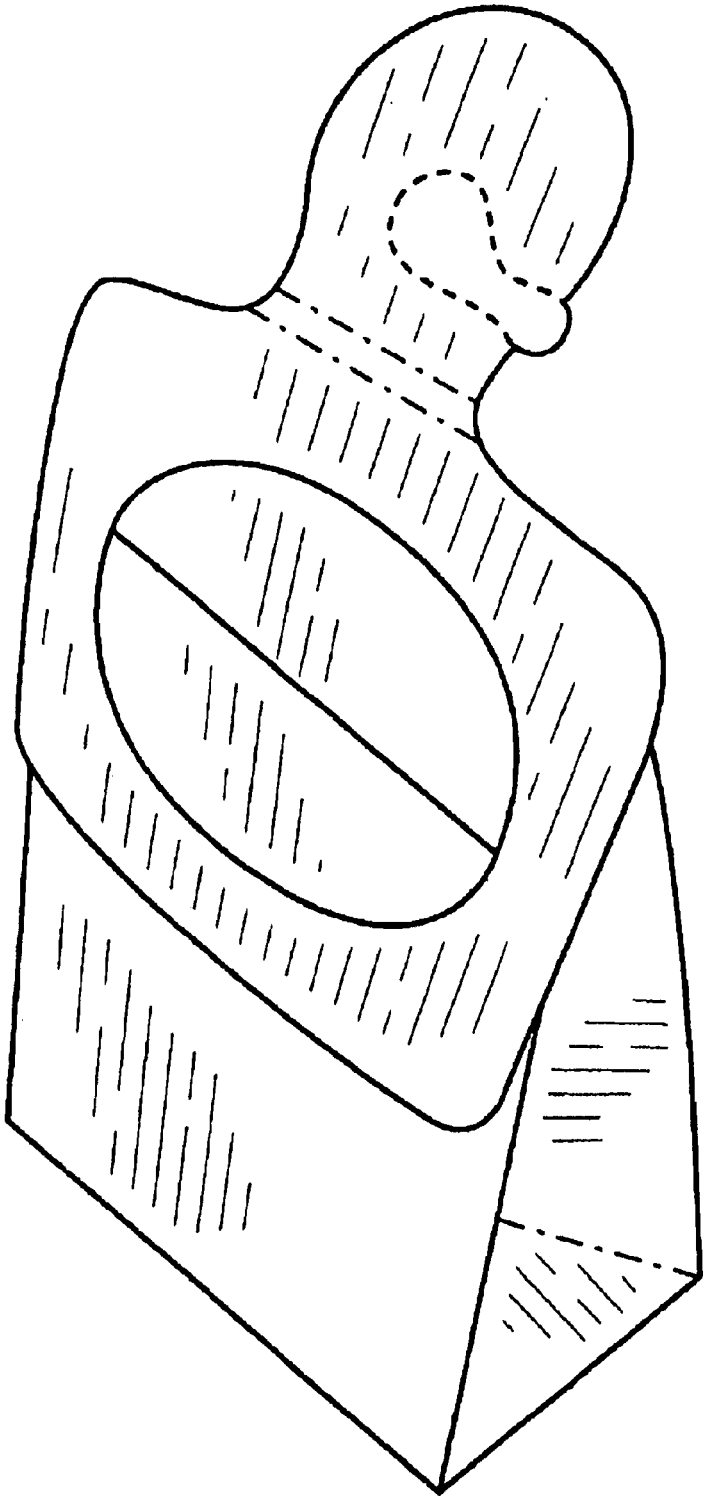
Figure 2:
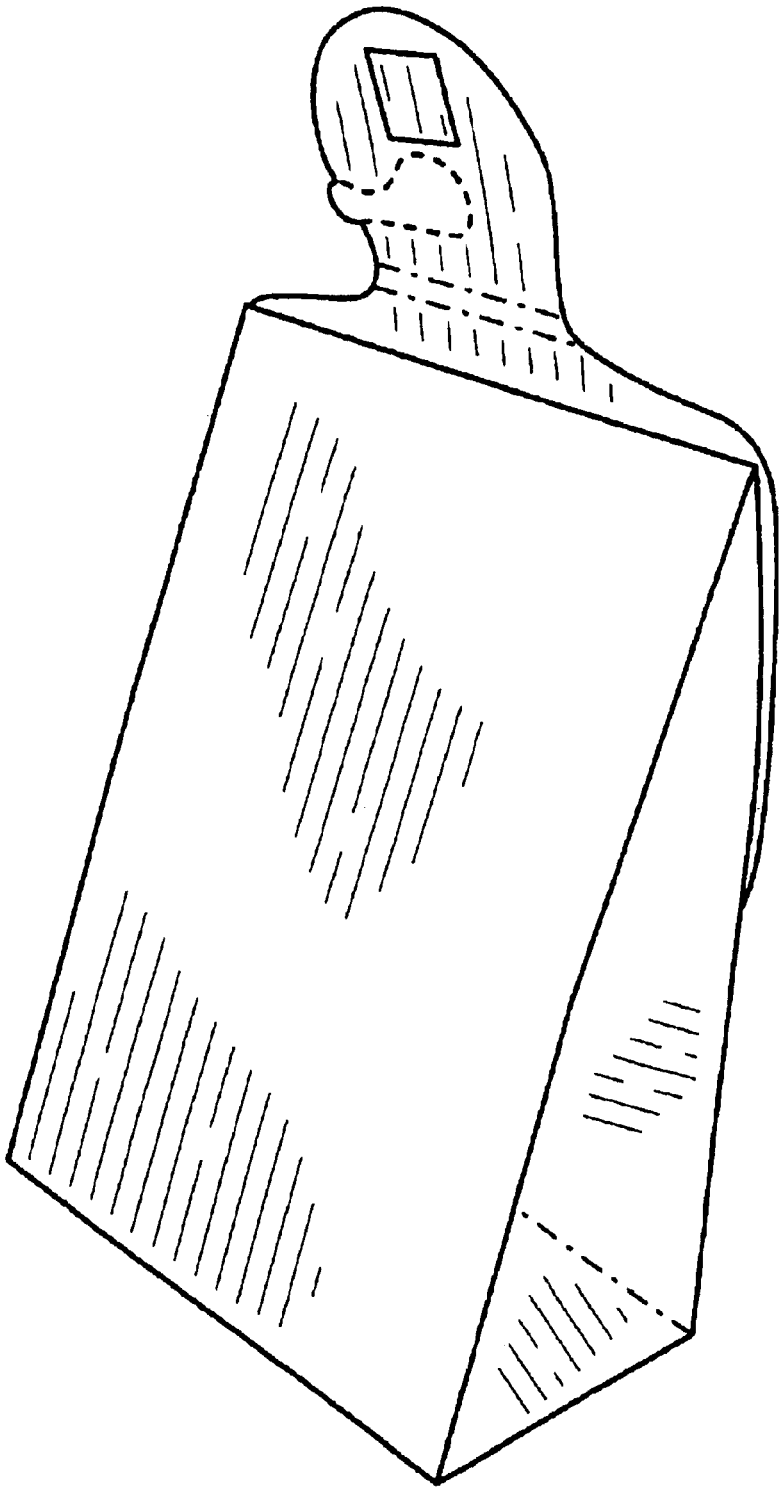
Figure 3:
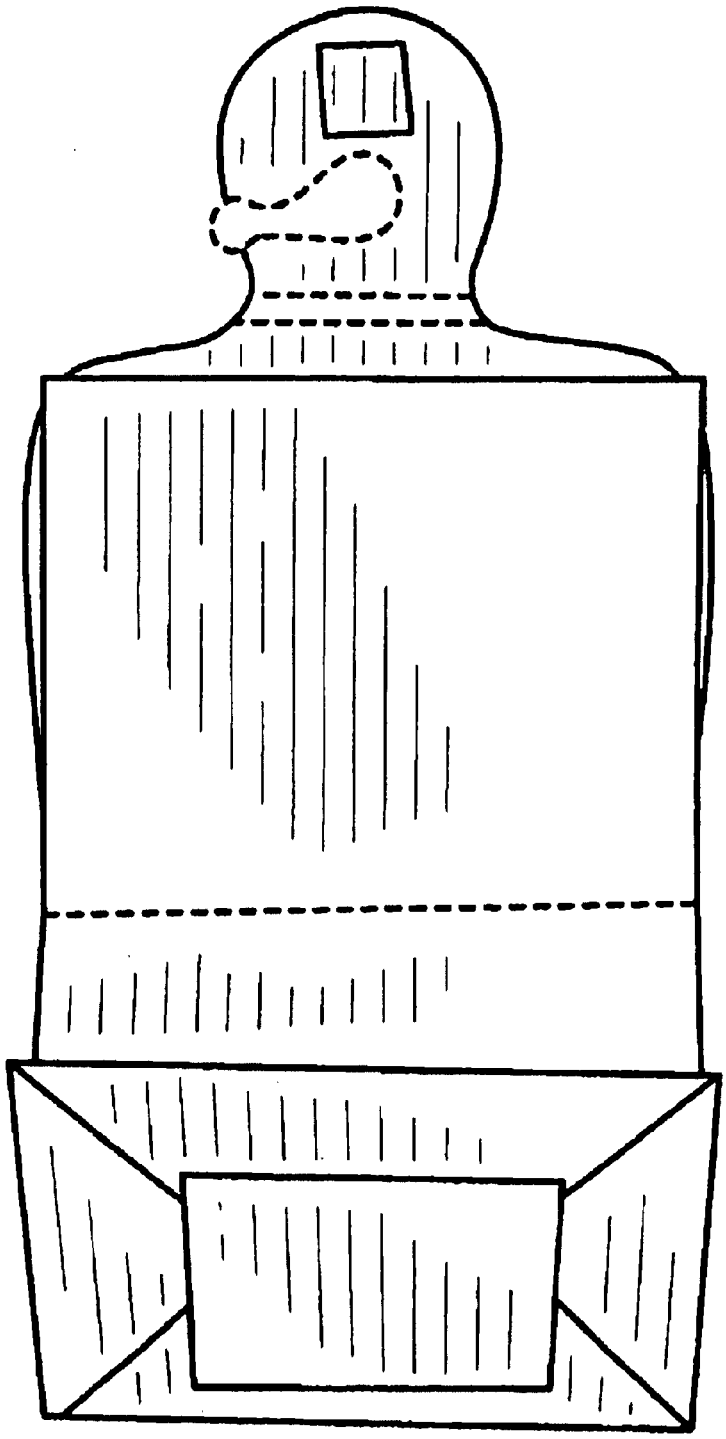
Figure 4:
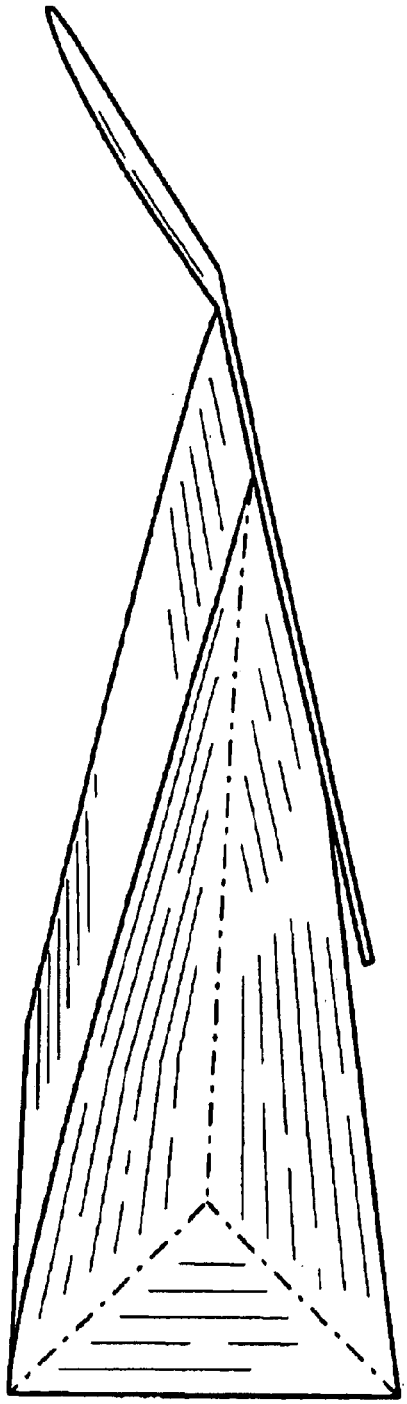
Figure 5:
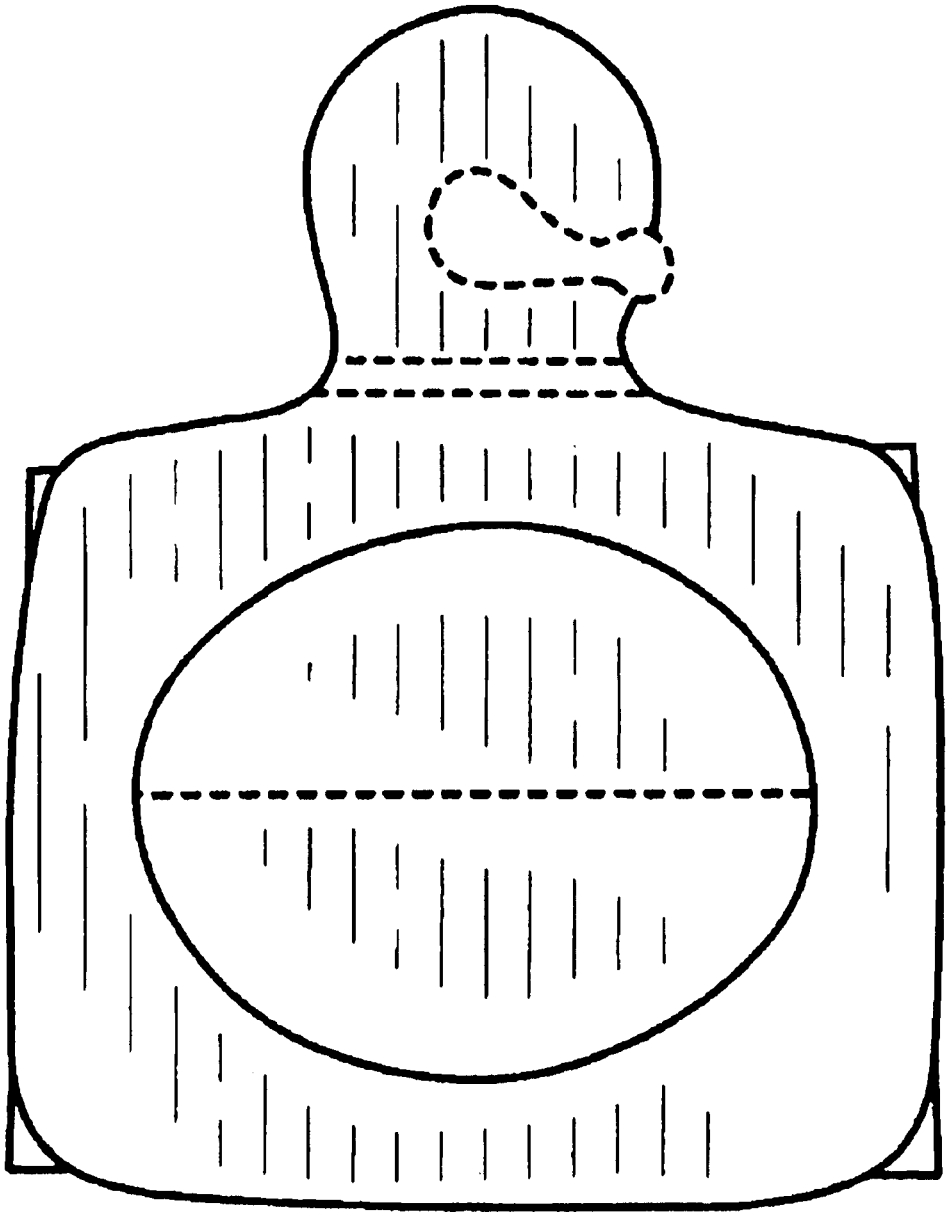

Matter enclosed in heavy brackets [ ] appears in the original patent, but forms no part of this reissue; matter printed in italics indicates the additions made by reissue.